L. HARRINGTON.
ELASTIC WHEEL.
APPLICATION FILED APR. 28, 1911.
1,103,512.
Patented July 14, 1914.
2 SHEETS—SHEET 1.
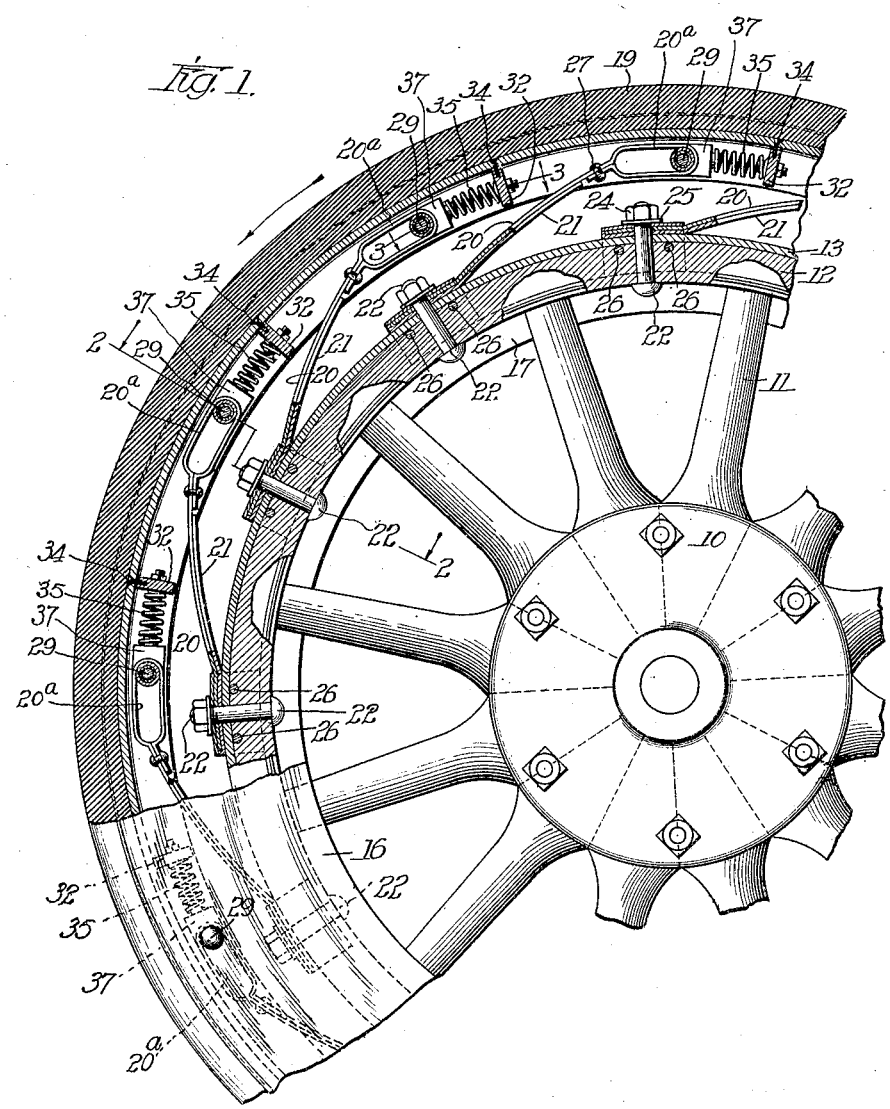

L. HARRINGTON.
ELASTIC WHEEL.
APPLICATION FILED APR. 28, 1911.
1,103,512.
Patented July 14, 1914.
2 SHEETS—SHEET 2.
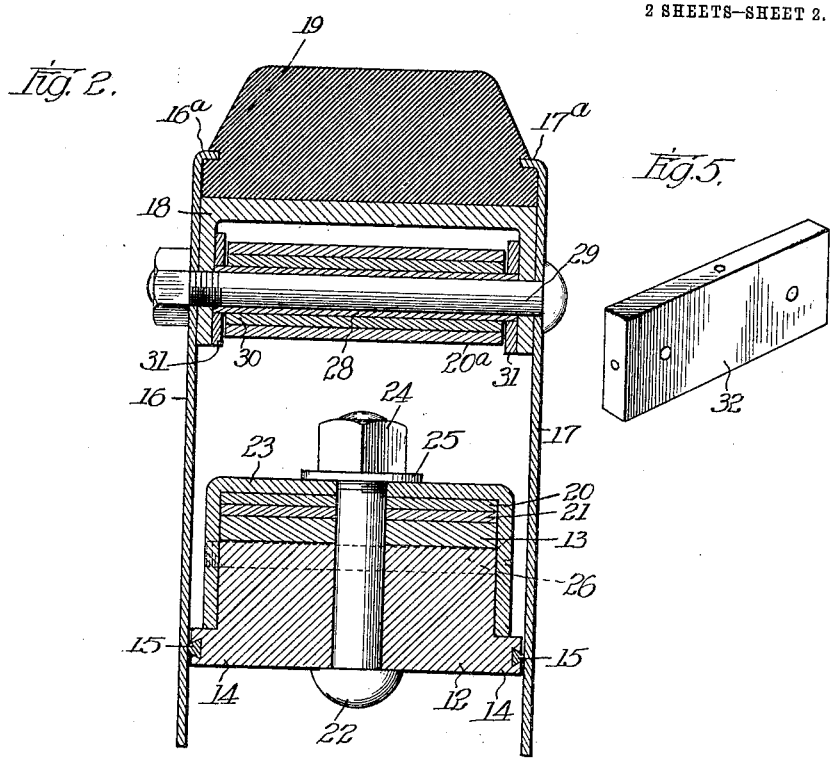
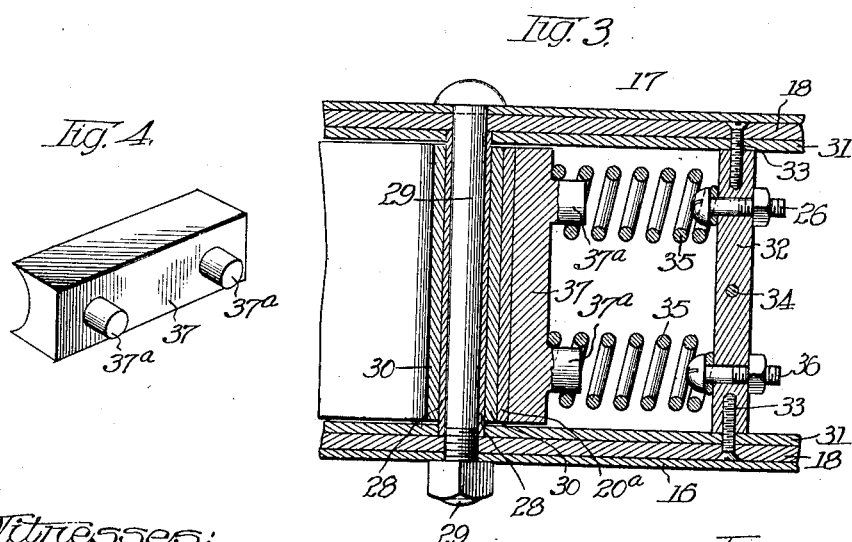
Witnesses:
Robert N. Weir
Inventor
Leslie Harrington
Brown & Hopkins
Attys.

ial, is secured. On the pe-# UNITED STATES PATENT OFFICE.

LESLIE HARRINGTON, OF CHICAGO, ILLINOIS, ASSIGNOR, BY MESNE ASSIGNMENTS, TO EDWARD G. HOFFMAN, LUIE H. MOORE, AND HOMER P. MOSES, OF FORT WAYNE, INDIANA.

ELASTIC WHEEL.

1,103,512.  Specification of Letters Patent.  Patented July 14, 1914.

Application filed April 28, 1911. Serial No. 623,883.

*To all whom it may concern:*

Be it known that I, LESLIE HARRINGTON, a citizen of the United States, residing at Chicago, in the county of Cook and State of Illinois, have invented certain new and useful Improvements in Elastic Wheels, of which the following is a full, clear, and exact specification.

The invention relates to elastic or resil10 ient wheels for vehicles and consists of certain improvements on the invention disclosed in my application Serial No. 550,282 filed March 18, 1910.

The object of the invention is to provide a strong, simple and efficient resilient vehicle wheel and particularly one in which the springs and other moving and shifting parts are so constructed and arranged as to avoid to the greatest possible extent wear due to friction of the parts and deterioration of the materials due to heating.

To accomplish these and other objects which are hereinafter set forth, the invention consists in the features of novelty de25 scribed in the specification shown in the drawings forming a part thereof and finally pointed out more specifically in the appended claims.

In the said drawings, Figure 1 is a side view of a segment of my improved wheel, the greater part of the rim and tire thereof being in section to disclose the details of construction. Fig. 2 is an enlarged radial section through tire and rim taken along the line 2—2 of Fig. 1. Fig. 3 is a horizontal section taken along the line 3—3 of Fig. 1 showing the details of construction by which the attachment of the tire of the rim of the wheel is secured at the outer extremi40 ties of the flat springs. Figs. 4 and 5 are perspective views of parts hereinafter described, and enlarged to show the details thereof.

The wheel, including the hub and spokes, may be of any usual or desired construction as, for example, the metal hub indicated by the reference character 10, and the wood spokes 11 of Fig. 1. To the outer extremities of the spokes the usual felly or rim 12, which as usual may be of wood or any other desired material, is secured. On the periphery of the rim 12 I place a circumferential supporting band of suitable metal, as steel, indicated by the reference character 13. The rim 12 is widest at its inner circumference, this portion being indicated by the reference character 14. Above this wide portion of the rim, the body portion is narrowed or cut away as indicated and the circumferential metallic band 13 is preferably of the same width as the narrowed portion of the rim. The wider portions 14 of the rim are preferably grooved and in these grooves packing, as indicated at 15, is secured, such packing being adapted to contact with the circumferential side plates 16 and 17 of the tire, thus forming a closure to exclude foreign particles of dirt, dust and the like from the interior portion of the tire. The circumferential plates 16 and 17 are secured to the sides of a circumferential channeled member 18, their upper edges, extending some distance beyond the outer periphery of the channeled member 18, being flanged inwardly as indicated at 16ª and 17ª, for the purpose of retaining in position the peripheral shoe or cushion tire which may be of any suitable cushioning or resilient material, although a firm material, as fiber, is preferred, which is indicated by the reference character 19, in Figs. 1 and 2 of the drawings. For elastically supporting the tire upon the rim, a plurality of springs of an improved construction are employed. These springs are preferably built up of a plurality of flat pieces of metal, as shown in Fig. 1, there being one member of flat material as indicated by the reference character 20 of suitable spring steel, one end of which is curved for a short distance to conform to the outer periphery of the metallic band 13, the material of this spring being of the same width as the band 13 and the contracted outer portion of the rim 12. Beneath the spring 20 is preferably although not necessarily an auxiliary supporting flat spring as indicated by the reference character 21, which may serve to strengthen and support the spring 20, both springs 20 and 21 being deflected tangentially from the outer periphery of the rim band 13 in order to contact with and support the movable tire portion of the wheel.

To secure the springs 20, 21 to the rim of the wheel, suitable retaining bolts, as indicated by the reference characters 22, are employed one for each spring, such bolts passing radially through the rim 12, metallic band 13 and the springs 20, 21, and through suitable U-shaped clamps, the angular extensions of which pass over the ends of springs 20, 21, metallic band 13 and the contracted side portions of the rim 12 and are seated at their extremities against the top side of the shoulders formed by the widened portions 14 of the rim, these clamps being indicated by the reference character 23. It is preferred that the bolts 22 be passed through the rim 12 with their threaded ends extending on the outside of the clamps 23 and their heads on the inner peripheral portions of the rim on account of the appearance of the assembled wheel and for the reason that threaded nuts, as indicated at 24, and washers 25 may be more easily placed in position on the ends of these bolts and screwed to their seats to bind the described parts together on the rims. As a further means of securing these parts to the rim, it is preferred that the angular extensions of the clamp 23 be provided with perforations at each side to take suitable screws as indicated at 26, the heads of which should preferably be countersunk in the extensions of the clamps and the other ends of the bolts threaded to engage threaded holes in the opposite sides of the clamps, the bolts 26 passing through suitable holes or grooves formed in the rim 12 preferably at the extreme outer surface thereof immediately beneath the metallic retaining band 13.

In building up the springs it is preferred that the members 21 shall terminate before the spring reaches the inner surface of the tire, the material of the spring 20, however, being extended and formed with a loop as indicated by the reference character 20$^a$, the extremity of the material being doubled upon itself and secured together preferably by a rivet as indicated at 27. The loops 20$^a$ at the outer extremities of the springs are formed with the sides thereof approximately parallel so that the loops may pass over suitable anti-friction rollers journaled in the tire for the purpose of securing the tire to the rim through the intermediary of the springs. These anti-friction rollers are shown on the interior of the looped portions of the springs in Figs. 1 to 3, inclusive, being rotatably supported on suitable bushings 28 extending between the angular flanges on the flanged tire member 18 and surrounding bolts 29 which are headed at one end and passed through the side plates 16, 17, of the tire, the flanges of the channel member 18 and are threaded at their other extremities to take suitable threaded nuts for securing the parts in position. The anti-friction rollers referred to for supporting the looped portions 20$^a$ of the springs are cylindrical in form and sleeved over metallic bushings 28. These rollers are preferably of fiber and are indicated by the reference character 30. The use of fiber in these anti-friction rollers provides against the contact of metal against metal between the working parts of the springs and tire, thus avoiding a certain amount of friction and providing against heating and undue wear which would otherwise result. This result, providing against heating and wear due to friction between coöperating parts of metal, is further secured by placing circumferential bands of fiber as indicated at 31 on the interior of the channeled portion of the metallic member 18 perforating such strips at intervals to permit the securing bolts 29 and their metallic bushings 28 to be passed through these fibrous strips. When these are employed the fiber rollers 30 are shortened, and the material of the springs, particularly the looped portions 20$^a$ thereof, is narrowed so that these parts contact with the circumferential fiber linings 31.

To take up any looseness in the connection between the tire and the rim due to the movement of the anti-friction rollers within the looped portions 20$^a$ of the springs suitable stops are formed within the interior channeled portion of the metallic member 18, as indicated by the reference character 32 shown in detail in Fig. 5. These stops may be secured to the interior of the channeled member 18 by any suitable means, as by the screws 33 passing through flanged portions of the member 18 and the fiber linings 31. As a further means screws, as indicated at 34, may be passed downwardly through the outer periphery of the member 18 and threaded into the stops. The stops 32 support one end of a plurality of coil springs as indicated by the reference character 35, there being preferably two of such springs secured to each by the retaining bolts 36. The opposite ends of the springs 35 are passed over lugs 37$^a$ integral on fiber blocks 37, one of which is shown in enlarged detail in Fig. 4, these blocks having the side opposite the lugs referred to formed concave to fit over the convex forward portions of the loops 20$^a$ of the springs. By so forming the blocks 37, since the pressure of the coil springs on the blocks will be constant, the parts will be kept constantly together and the action of the coil springs 35 will normally tend to separate the stops 32 secured to the tire and the forward extremities of the looped portions 20$^a$ of the springs with the result that the anti-friction rollers carried on bolts 29 secured to the tire will be seated against the forward extremities of the interior portions of the spring loops. In this manner the tire is rigidly anchored to the rim of the wheel by the springs secured as described to the wheel rim and also normally in contact with the tire through the anti-friction rollers which are fixed rigidly to the tire. When, therefore, the wheel of my improved construction is employed on a motor car and power is applied to the hub of the wheel for the purpose of moving the car, the wheel will be rotated in the direction indicated by the arrows in Fig. 1 while the connection between the wheel rim and the tire will be an unusually positive connection and driving power may be applied to the hub of the wheel and transmitted to the tire without injuring the elastic connections between the rim and the tire.

In spring wheels heretofore constructed it has been found difficult to anchor the rims and the tires to prevent injury to the delicate means heretofore employed for securing resiliency between the parts. It will be seen that this difficulty is avoided in my improved construction, because any power applied to turn the rim of the wheel when rotated in the direction indicated by the arrows will result in a direct pull lengthwise of the steel springs and that such pull will be distributed equally upon each spring of the series around the entire periphery of the wheel. Heretofore in the constructions employed in spring wheels the result has usually been that the entire strain between the rim and tire has been imposed upon a single resilient connection out of a series of such connections distributed around the periphery of the wheel. It will be further seen that the action of compression coil springs 35 interposed between the ends of the flat springs and the tire will constantly hold the tire and the rim of the wheel in a fixed definite relation preventing any looseness or noise when the wheel is in operation. It will also be seen that when pressure is applied to the tire of the wheel causing the tire to approach the rim, such approach of the parts will be resisted both by the flat springs 20, 21, and the coil springs, since the approach of the tire to the rim of the wheel will tend to lengthen the spring 20 causing the looped portion 28 to ride over the anti-friction roller and causing the forward extremity of the loop portion 20ª of the flat spring to approach the fixed stop 34 and hence will compress coil springs 35. When such pressure is released both the flat springs 20, 21, and the coil springs being under tension, the parts will be promptly returned to normal, as shown in Fig. 1. My construction is therefore particularly advantageous because of the unusual strength which may be given to the parts due to the features of construction hereinbefore described. For example, heretofore it has been usually found necessary in elastic wheels to secure the tires to the rims of the wheels by peripheral side plates which slide over the sides of the wheel rims similar to those indicated by the reference characters 16, 17, and it has been found necessary to make these side plates of a sufficiently strong construction to withstand all side strains between tire and rim. These side plates have, therefore, usually been made so heavy as to seriously interfere with the proper operation and resiliency of the wheels. By the use of my improved flat steel springs 20, 21, and particularly the improved means for permanently and securely clamping them to the rims and their uniform widths extending from rim into the inner channel portions of the tires and bearing against the fiber linings in the tires, enables these flat steel springs to resist practically all side strains tending to displace the tires laterally from the rims of the wheels. This improved construction makes it possible to make the side plates 16, 17, of a very light quality of material, their chief function being merely to exclude dirt, dust and foreign particles from the interior of the tires. Furthermore the fiber linings comprising the peripheral side strips at the ends of the anti-friction rollers since they extend around the periphery of the wheel they receive any friction which might result between the springs and the tire, and these, together with the fiber roller and the fiber member 37 between the coil springs and the flat spring, practically relieve the wheel of any contact of metal upon metal, thus preventing noise and the deterioration of the metal of the springs due to friction and consequent heating and therefore greatly prolonging the life of the wheel. Furthermore, with my improved construction, the side plates 16, 17, of the tire may be readily removed, thus rendering the interior of the tire easily accessible for the purpose of adjusting or repairing any worn or injured parts.

The springs and also their associated parts, it will be seen, are in duplicate, which renders the manufacture of the parts by labor-saving machinery easy and makes the wheel economical as well as efficient on account of the ease and cheapness with which repairs may be made.

In order that the invention might be understood the details of the embodiment most preferred have been shown and described in detail. It will be apparent that persons skilled in this art may resort to many modifications of the details shown without departing from the purpose and spirit of the invention.

What I claim is—

1. In a wheel, the combination with a rim, of a tire movably mounted in relation to the rim, a plurality of flat springs interposed tangentially between said tire and rim, said flat springs being fixed at one end to the rim and movably secured to the tire at the other end and being provided at their ends adjacent the tire with loops, anti-friction rollers within said loops and fixed in relation to the tire, a fixed stop on the tire, coiled springs engaging said fixed stops at one end, and a block of fibrous material interposed between the forward extremities of the loops on said flat springs and the said coiled springs, there being lugs formed integrally on said fibrous block for engaging the hollow ends of said coiled springs.

2. In a wheel, the combination with a rim, of a tire movably mounted in relation to the rim, said tire comprising a metallic member channeled on its inner circumferential portion and being provided with a suitable tread on its outer circumference, a plurality of flat springs each secured at one end to the rim of the wheel, each spring being of uniform width throughout and of approximately the width of the rim, there being loops formed on the ends of the springs adjacent the tire, anti-friction rollers of fiber journaled within the said spring loops within the channeled inner circumferential portion of the tire and a lining of fibrous material within the channeled portion of the tire at the sides thereof.

3. In a wheel, the combination with a rim, comprising a circumferential body portion on its inner periphery and a contracted portion including the outer peripheral portion of the rim, a tire movably mounted in relation to the rim, a plurality of flat springs of uniform width throughout and being of the same width as the contracted portion of the rim, and extending tangentially into movable engagement with the tire, and means for securing the said springs to the contracted portion of the rim comprising a U-shaped clamp, the branches of which are separated a distance equal to the width of the contracted portion of the rim and the width of the said flat springs and extend beyond said springs and rim.

4. In a wheel, the combination with a rim provided on its outer periphery with a contracted portion, a tire movably mounted in relation to the rim, a plurality of flat springs secured to the rim and extending tangentially to have movable engagement with the tire, and clamps for securing the said flat springs to the wheel rim, each of said clamps comprising a U-shaped member having parallel extensions adapted to register with a contracted portion of the wheel rim, both said clamps and said rim being provided with registering openings for radial and horizontal securing bolts.

5. A combination with a hub, spokes and felly, said felly provided with a reduced portion, of resilient members extending tangentially from the reduced portion of said felly, U-shaped clamps extending over said resilient members and the reduced portion of the felly aforesaid, means for securing said resilient members and clamps to said felly, a rim encircling said felly, movable connections between the outer terminals of said resilient members and said rim, and springs exerting a pressure directly upon the ends of said movable connections.

6. A combination with a hub, spokes and felly, said felly provided with a reduced portion, of resilient members extending tangentially from the reduced portion of said felly, U-shaped clamps extending over said resilient members and the reduced portion of the felly aforesaid, means for securing said resilient members and clamps to said felly, a rim encircling said felly, movable connections between the outer terminals of said resilient members and said rim, and means operable directly against said movable connections for receiving the end thrusts of said resilient members.

7. The combination with a hub, spokes and felly, a rim encircling said felly and constructed of a channel bar, pins piercing the flanges of said rim, bushings mounted on said pins and terminating directly against the flanges of the rim aforesaid, resilient members secured to said felly, movable connections between said resilient members and said felly, embracing said pins and bushings aforesaid, and means operating directly against said movable connections for receiving the end thrusts of said resilient members.

8. The combination with a hub, spokes and felly, a rim encircling said felly constructed of a channel bar, pins piercing the flanges of said rim, bushings mounted on said pins and terminating directly against the flanges of the rim aforesaid, resilient members secured to said felly, anti-friction rollers embracing said bushings, movable connections between said resilient members and said rim operating upon said anti-friction rollers, and means operating directly against said movable connections for taking up the end thrusts of said resilient members.

9. The combination with a hub, spokes and felly, of a plurality of resilient members secured to said felly, an internally channeled rim encircling said felly, pins or bolts piercing the flanges of said rim, bushings mounted upon said pins or bolts for retaining said flanges in fixed correlation, anti-friction rollers surrounding said bushings, slidable connections between said resilient members and said rim embracing said anti-friction rollers, blocks operating against the terminals of said connections, stops spaced from and arranged parallel to said blocks, and springs interposed between said stops and said blocks for receiving the end thrusts of said resilient members, said bushings, anti-friction rollers, slidable connections, blocks, stops and springs being housed between the flanges of said rim.

In testimony whereof I have signed my name to this specification, in the presence of two subscribing witnesses, on this 25th day of April A. D. 1911.

LESLIE HARRINGTON.

Witnesses:
 FRANK T. BROWN,
 NINA J. HALSNE.

Copies of this patent may be obtained for five cents each, by addressing the "Commissioner of Patents, Washington, D. C."